United States Patent [19]

Beck

[11] 4,326,596

[45] Apr. 27, 1982

[54] ELECTRONIC WEIGHING APPARATUS

[75] Inventor: William P. Beck, Westchester, Ill.

[73] Assignee: Borg-Erickson Corporation, Chicago, Ill.

[21] Appl. No.: 167,770

[22] Filed: Jul. 10, 1980

[51] Int. Cl.³ .................... G01G 23/32; G01G 3/14
[52] U.S. Cl. ................... 177/178; 177/210 R; 177/DIG. 6
[58] Field of Search ............... 177/177, 178, 210 R, 177/DIG. 6

[56] References Cited

U.S. PATENT DOCUMENTS

| | | | |
|---|---|---|---|
| 2,147,936 | 2/1939 | Sutton . | |
| 2,812,422 | 11/1957 | Provi . | |
| 3,853,191 | 12/1974 | Yamagiwa | 177/210 R |
| 4,072,201 | 2/1978 | Wiesler | 177/210 R |
| 4,082,153 | 4/1978 | Provi | 177/177 |
| 4,258,812 | 3/1981 | Pfeiffer | 177/DIG. 6 |

Primary Examiner—George H. Miller, Jr.

Attorney, Agent, or Firm—Hume, Clement, Brinks, Willian & Olds, Ltd.

[57] ABSTRACT

An electronic weighing apparatus includes a switch mounted on a base surface thereof, actuated by an actuating member biased to support a portion of the base. When weight is applied to the apparatus, the actuating member is moved to a depressed position, thereby automatically energizing the apparatus. In addition, a tab is mounted to the base near the switch. Vertical forces can be applied to the tab to depress the actuating member without disturbing the zero position of the weighing apparatus.

Furthermore, the apparatus includes an optical coded disc with a plurality of concentric code tracks. A light guide conducts light to a line on the disc which is parallel to but offset from a radius of the disc. Photosensors are positioned on the other side of the disc, opposed to the light guide. A mask is interposed between the photosensors and the light guide, which mask defines a plurality of apertures, each of which is oriented parallel to a radius of a respective code track such that no two of the apertures are parallel.

6 Claims, 7 Drawing Figures

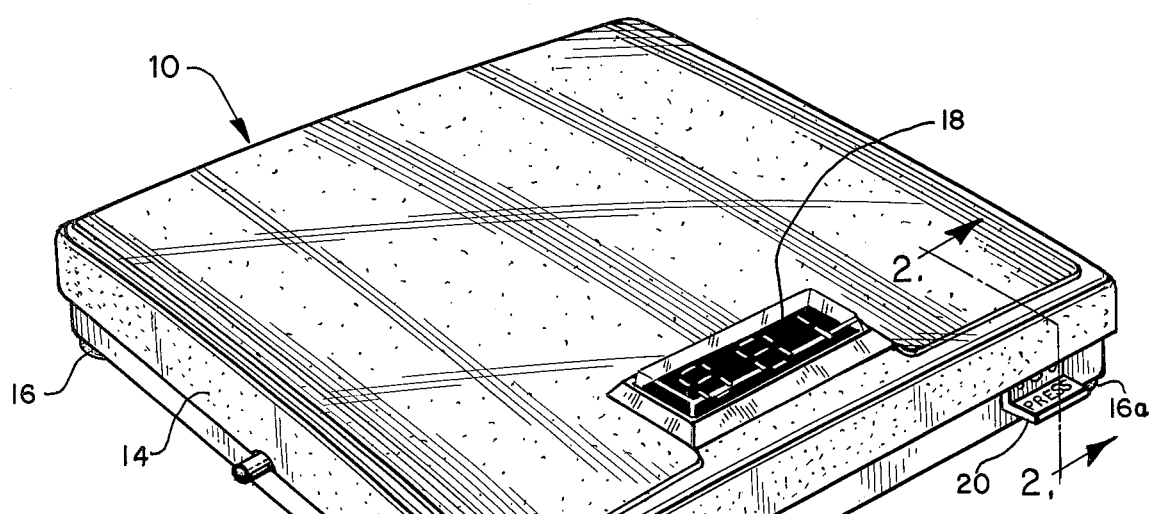
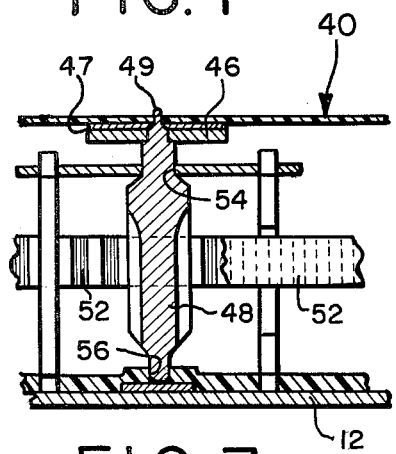
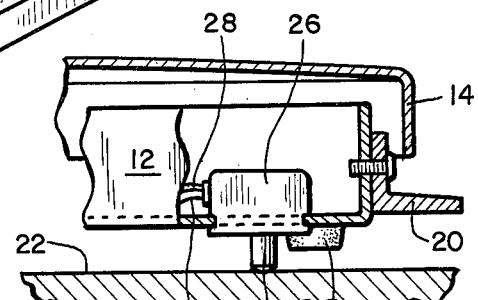
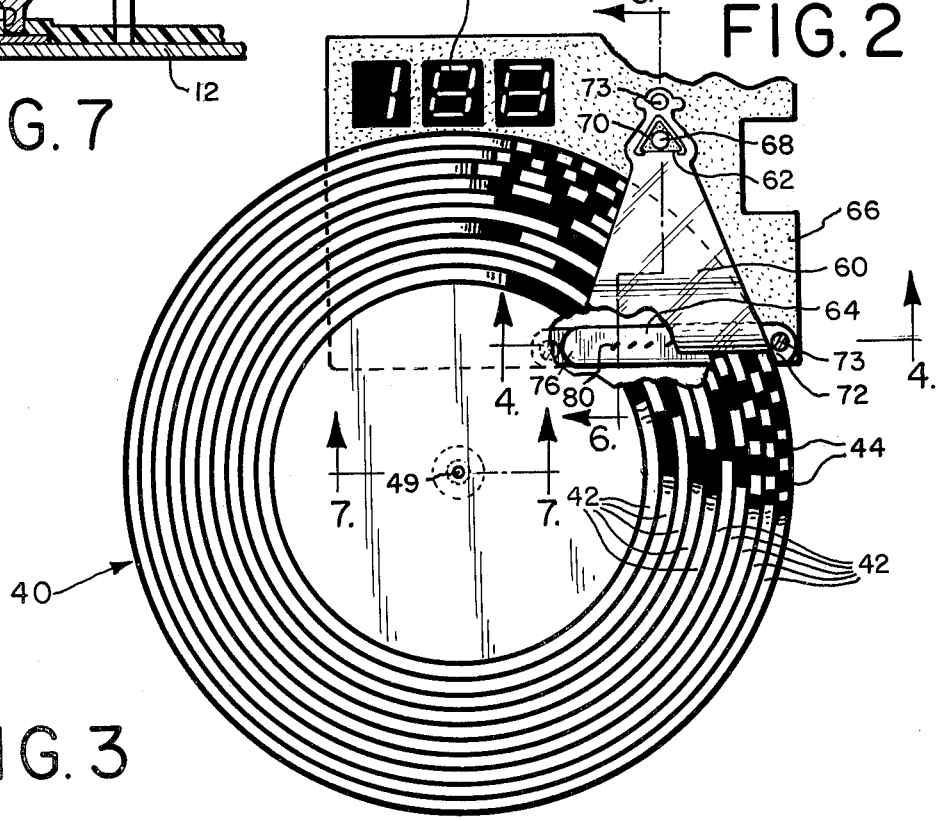

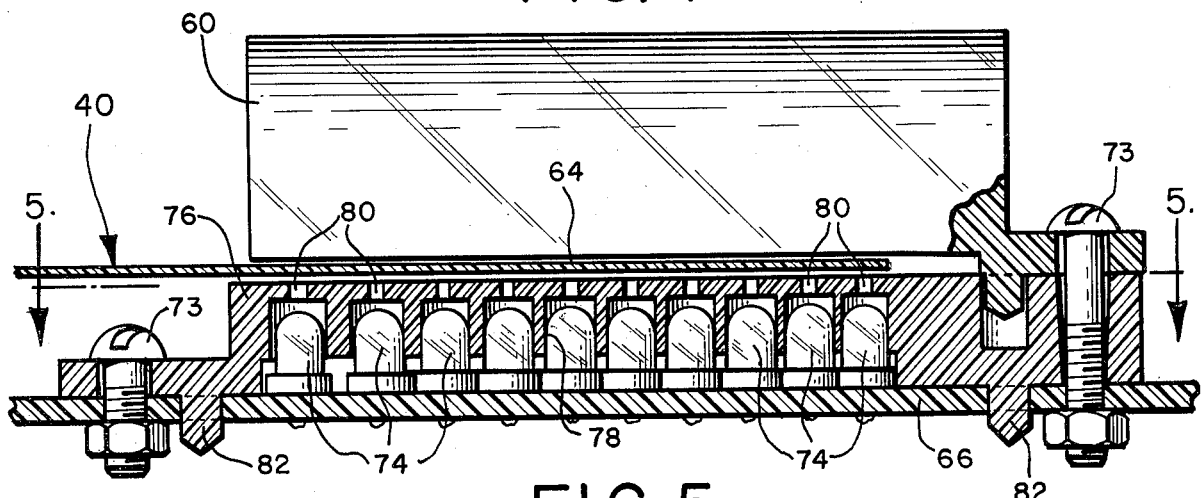
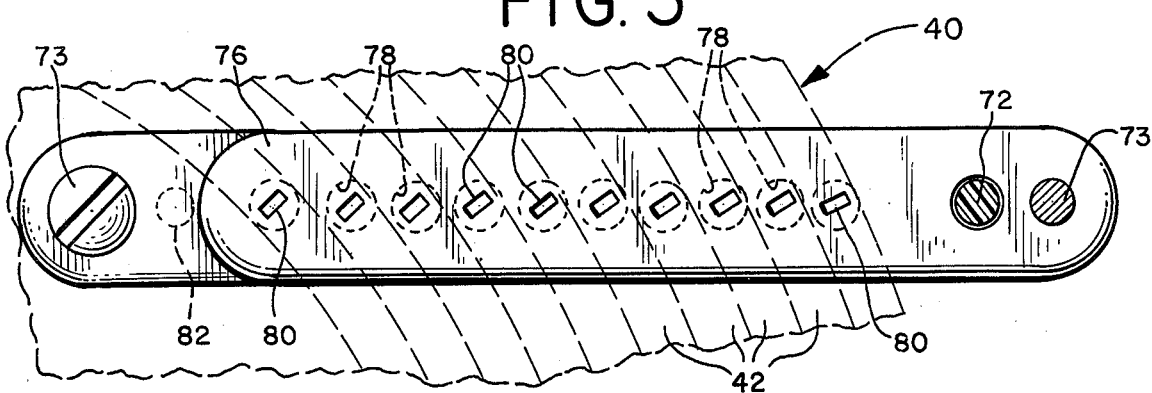
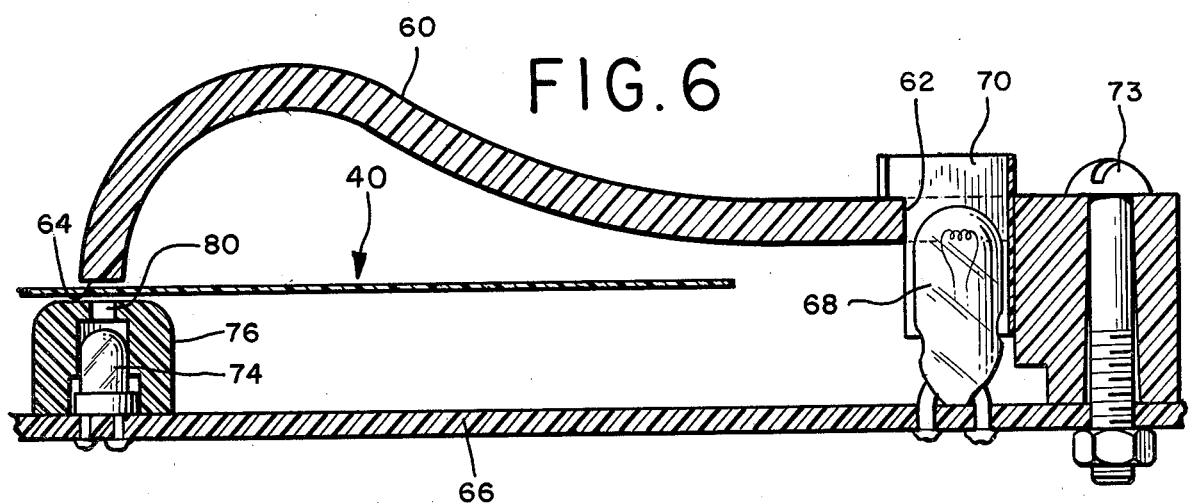

ELECTRONIC WEIGHING APPARATUS

BACKGROUND OF THE INVENTION

The present invention relates to improvements in electronic weighing devices such as scales, and in particular to an improved switching apparatus and an improved coded disc reading apparatus for such devices.

Electronic weighing devices such as digital scales employing optically coded discs are known to the art. One type of such scale employs a scale mechanism which rotates an optically coded disc to a position which corresponds to the magnitude of the vertical forces applied to the scale mechanism. A reading mechanism is provided to sense optically coded indicia on the disc to measure the position of the disc and thereby the applied vertical force.

One recurring problem of the prior art relates to the manner in which the reading mechanism is switched on and off. It is often preferable to use batteries contained in the scale to power the reading mechanism, and in order to extend battery life it is important to de-energize the reading mechanism when not in use.

One approach to this problem is to use a kick-bar on the scale to allow a user to activate the reading mechanism manually. U.S. Pat. No. 4,082,153 shows one such device. An important disadvantage of this approach is that the scale does not automatically energize upon use. Instead, an active decision by the user to turn on the scale is required.

A second approach is to employ an automatic switch which works off of the scale mechanism and is therefore responsive to applied vertical forces on the scale. This approach provides the advantage of automatic operation. However, since the switch works off of the scale mechanism, it can on occasion interfere with the proper operation of the scale mechanism. Furthermore, additional means must be provided to energize the scale for zero set operations, when no vertical forces are applied to the scale mechanism. In the past, such additional means have included manually operated switches, which may be relatively inaccessible. In addition, this approach generally requires that the user be instructed as to how to find and manipulate this additional means.

An additional aspect of the prior art relates to light guides which direct light from a source such as a light bulb or LED to the optically coded disc for use in sensing the optical indicia on the disc. In the past, such light guides have been designed to direct light onto a radius of the disc, and the associated photosensors have been aligned along this radius as well. This approach results in a bulky and elongated light guide which extends from a radius to a point beyond the periphery of the disc. Such bulky light guides can result in mounting structures which are larger and therefore more expensive to manufacture than necessary.

SUMMARY OF THE INVENTION

The present invention is directed to an improved electronic weighing apparatus. According to a first aspect of the invention, a weighing apparatus is provided with a base and a platform supported on the base. The weighing apparatus includes scale means for measuring the magnitude of vertical forces applied to the platform, which scale means is electrically powered, and a source of electrical power. A switch is provided for selectively connecting and disconnecting the scale means and the source. This switch is responsive to an actuating member which protrudes out of the base and is biased into an extended position, in which the actuating member supports a portion of the base above a support surface and the switch disconnects the scale means from the source. When sufficient downward forces are applied to the base, as for example when a user stands on the platform, the actuating member moves to a depressed position, thereby causing the switch automatically to energize the scale means. In addition, a tab is provided which is mounted to the base to transmit downward forces from the tab directly to the base and the actuating member. By merely pressing down on the tab, a user can energize the scale means for zero setting operations without placing any weight on the platform or the scale means.

This first aspect of the invention provides several important advantages. The scale means is automatically energized whenever a user steps onto the platform, yet the switch does not interfere in any way with the operation of the scale means. Because the switch is activated by forces between the support surface and the base, and not by the scale means, there is no need to use a delicate switch. Thus a robust and reliable switch can be used without interfering with the operation of the scale means. Furthermore, there is no need for a manual switch to energize the scale means for zero adjustment. Because the switch is activated by forces between the support surface and the base, downward forces applied directly to the base via the tab activate the switch without disturbing the zero position of the scale means. Thus the need for redundant manually operated switches is eliminated.

According to a second aspect of the invention, a weighing apparatus is provided with a coded disc which is positioned by a scale means to a position which corresponds to the force applied to a platform. The coded disc is provided with a plurality of code tracks, each of which includes a plurality of optical indicia. Preferably the edges of the indicia are oriented radially with respct to code tracks. A plurality of photosensors are oriented adjacent the code disc on a line offset from a radius of the coded disc, which line intersects the code tracks such that each photosensor is mounted adjacent one of the code tracks to sense the respective indicia. Preferably the line is oriented tangentially to a circle centered at the axis of rotation of the disc and having a radius no greater than that of the innermost code track. A light source is provided, mounted adjacent one end of a light guide which extends from the light source to the coded disc in a position corresponding to the plurality of photosensors. Preferably, a mask is interposed between the light guide and the photosensors, said mask defining a plurality of apertures, each of which defines an elongated axis. Preferably, each aperture is associated with one of the photosensors and the longitudinal axis of each aperture is oriented radially with respect to the corresponding code track.

Because the coded disc end of the light guide is not oriented along a radius of the coded disc, the light guide can be made shorter and less bulky than otherwise would be possible. This reduces the cost and bulk of the light guide, as well as of the associated mounting structures such as circuit boards. In addition, the light guide of this invention provides a shorter path for light as it is directed from the light source to the disc.

The invention itself, together with further objects and attendant advantages will best be understood by reference to the following detailed description taken in connection with the accompanying drawings.

BRIEF DESCRIPTION OF THE DRAWINGS

FIG. 1 is a perspective view of a weighing apparatus which includes preferred embodiments of each of the aspects of this invention.

FIG. 2 is a cross-sectional view taken along line 2—2 of FIG. 1.

FIG. 3 is a top cutaway view of optical and display portions of the embodiment of FIG. 1.

FIG. 4 is a cross-sectional view taken along line 4—4 of FIG. 3.

FIG. 5 is a cross-sectional view taken along line 5—5 of FIG. 4.

FIG. 6 is a cross-sectional view taken along line 6—6 of FIG. 3.

FIG. 7 is a cross-sectional view taken along line 7—7 of FIG. 3.

DETAILED DESCRIPTION OF PREFERRED EMBODIMENTS

Referring now to the drawings, FIG. 1 shows a perspective view of a scale 10 which incorporates preferred embodiments of both aspects of the present invention. This scale 10 includes a base 12 which is provided with four base supports 16 which support the base on a support surface 22. A platform 14 is mounted over the base 12 such that vertical forces applied to the platform 14 are transmitted via a scale mechanism (not shown) to the base 12. A digital display 18 is visible through the platform 14. As will be explained below, this display 18 includes a three digit LED display which digitally indicates the weight placed on the platform 14.

As best shown in FIG. 2, a horizontally projecting tab 20 is mounted directly to the base 12 near one of the base supports 16a. A switch 26 is also mounted to the underside of the base 12 adjacent the tab 20. In this preferred embodiment, all electronic circuitry (not shown) of the scale 10 is powered by a battery (not shown). The switch 26 is connected in series between the battery and the circuitry via leads 28,30 such that the switch can selectively interconnect the battery and the circuitry to energize the circuitry, or disconnect the battery and the circuitry to de-energize the circuitry.

The switch 26 is switched by an actuating member 32 which extends vertically out the bottom of the base 12. This actuating member 32 is biased outwardly into an extended position shown in FIG. 2, in which the actuating member 32 contacts the support surface 22 and supports the base support 16a above the support surface 22. The biasing force is preferably in the range of 2.5 to 6 pounds, so that the rest position of the scale 10 when no weight is applied to the platform 14 is as shown in FIG. 2. When the actuating member 32 is in the extended position, the switch 26 disconnects leads 28 and 30, thereby de-energizing all electrical circuitry of the scale 10 to minimize battery drain.

However, when a downward force in excess of the biasing force is applied to the actuating member 32, it moves to a depressed position, thereby allowing the base support 16a to contact the support surface 22. When the actuating member is in the depressed position the switch 26 connects the battery to the circuitry to energize the scale. The tab 20 is secured to the base 12 near the switch 26 to allow a user to turn on the scale circuitry without applying downward forces to the platform 14. Thus, when the user desires to adjust the zero point of the scale, the scale circuitry can be readily and conveniently actuated with the tab 20 without disturbing the zero point of the scale mechanism by applying forces to the platform 14.

The arrangement of the switch 26 and the tab 20 provides several important advantages. First, the operation of the switch is completely automatic in normal use of the scale. Second, the switch 26 is not responsive to the scale mechanism. For this reason a heavy duty, rugged switch can be used without interfering in any way with the delicate scale mechanism. Third, the tab allows the scale to be activated for zero adjustments simply and easily, without the requirement for an additional switch or for access into the interior of the scale.

Turning now to FIGS. 3-7, the scale mechanism of the scale 10 includes an optically coded disc 40 which includes ten circular, concentric code tracks 42. Each code track is in turn made up of a plurality of optical indicia 44. In this preferred embodiment the code disc is circular in shape, having a diameter of 6.85 inches, and is formed of transparent Mylar, 0.004 inches in thickness. The optical indicia 44 are printed on one surface of the disc 40 to create a pattern of optically opaque and optically transparent regions.

As best shown in FIG. 7, the disc 40 is mounted to a mounting plate 46 by means of an adhesive layer 47. The mounting plate 46 is in turn secured to a pinion 48 which is mounted to rotate about a vertical axis by upper and lower bearings 54,56, which cooperate with upper and lower pinion support plates 50,51 which are rigidly secured to the base 12. The pinion 48 is provided with gear teeth which mesh with a rack 52. This rack 52 is moved by a conventional scale mechanism (not shown) such that the linear position of the rack 52, and hence the angular position of the pinion 48, correspond to the downward forces applied to the platform 14. The centering tip 49 of the pinion 48 serves to define the center of rotation of the disc 40 precisely.

The adhesive layer 47 used to mount the disc 40 to the mounting plate 46 provides sufficient bonding forces to prevent shifting of the disc 40, in part because of the light weight and low moment of inertia of the disc 40. This adhesive layer is preferably a tacky adhesive such as double sided foam tape so that the disc 40 can be removed and shifted if necessary during assembly of the scale to calibrate the scale properly. One advantage of this means for attaching the disc 40 to the mounting plate 46 is that no aligned openings and fasteners are required. This speeds assembly, and facilitates proper angular positioning of the disc 40 on the mounting plate 46. Inevitable variations in the required placement of the disc 40 due to manufacturing tolerances in the scale mechanism can be made simply and easily.

Turning now to FIGS. 3-6, the angular position of the disc 40 is measured by means of a reading assembly which illuminates a portion of the disc 40 and optically sense the pattern of optical indicia 44 on each code track along a selected line on the disc 40. The indicia on the disc 40 are patterned such that each of a predetermined number of angular positions of the disc 40 is characterized by a unique binary optical pattern, which encodes the corresponding number to be displayed on the display 18. A gray scale binary code is preferably used.

The reading assembly is made up of two major subassemblies, the light guide 60 and the photosensor guide block 76, both of which are rigidly mounted to a mounting board 66. The light guide 60, which is fastened to the board 66 by means of two fasteners 73, includes a first end 62 adjacent a light bulb 68, and a second end 64 adjacent the disc 40. The light bulb 68 is positioned within an opening formed in the light guide 60, and a reflector 70 is positioned around a portion of the opening to direct light from the bulb 68 toward the first end 62. The light guide 60 acts to direct light from the bulb 68 onto the disc 40. As best shown in FIGS. 3 and 5, the second end 64 of the light guide 60 is oriented along a line which is tangential to a circle somewhat smaller than the innermost code track and is parallel to but offset from a radius of the disc 40.

In this preferred embodiment, the light guide 60 is formed from crystal styrene. The entire light guide 60, including both ends 62,64, is preferably provided with an optical polish to maximize the efficiency with which light is conducted to the disc 40. The reflector 70 is preferably formed of silver colored reflective Mylar, and the light bulb 68 is preferably cemented in place after being adjusted for maximum light at the second end 64.

As shown in FIGS. 4 and 6, the photosensor guide block 76 is rigidly mounted to the mounting board 66 by fasteners 73 and is precisely aligned on the board 66 by guide pins 82 such that the guide block 76 is situated directly under the second end 64 of the light guide 60. A gap of 0.05 inches is defined between the second end 64 of the light guide 60 and the upper surface of the guide block 76, and the disc 40 moves in this gap.

The guide block 76 defines a number of colinear recesses 78, each of which is sized to receive and align a photosensor 74. In this preferred embodiment, each photosensor is preferably a phototransistor model FPT 8070 marketed by Fairchild Corp. The guide block 76 aligns the photosensors 76 along the centerline of the second end 64 of the light guide such that each photosensor 74 is placed under a respective one of the concentric code tracks. These photosensors are aligned tangentially to a circle somewhat smaller than the innermost code track.

As shown in FIG. 5, the guide block 76 defines a plurality of apertures 80, each of which defines the field of view of a respective photosensor 74. In this preferred embodiment, each aperture 80 is rectangular in shape, measuring 0.100 inch long by 0.040 inch wide. Each aperture 80 defines a longitudinal axis centered along the length of the aperture. In this preferred embodiment, each of the optical indicia is a region bounded at two edges by radial lines. In order to maximize reading accuracy, the longitudinal axis of each aperture 80 is oriented to be radial to the respective code track 42 and therefore parallel to the radial edges of the respective optical indicia 44. Because the guide block 76 is oriented parallel to but offset from a radius of the disc 40, the longitudinal axes of the apertures 80 are not parallel, but instead each longitudinal axis is skewed with respect to each of the other longitudinal axes.

The photosensors 74 generate a pattern of binary electrical signals corresponding to the binary optical pattern of the indicia overlying the apertures 80. These electrical signals are decoded by a display circuit (not shown), which drives the display 18 to correspond to the optical pattern measured by the photosensors 74.

The light guide 60 provides several important advantages. Because the second end of the light guide is offset from a radius of the disc 40, the entire light guide 60 is shorter, lighter, and less bulky than otherwise. This reduces the cost and bulk of the light guide 60. In addition, the mounting board 66 can be made smaller, thereby further reducing manufacturing costs, and the guide 60 reduces the total distance light must travel from the bulb 68 of the disc 40.

Of course, various changes and modifications to the preferred embodiment described above will be apparent to those skilled in the art. For example, the improvements of the present invention can be readily adapted for other types of scales, such as counter scales, for example. Furthermore, the improved reading assembly of this invention can be modified for use on a reflective coded disc, in which case both the light guide and the photosensors would be situated on the same side of the disc. The sizes of the various components can be varied to suit other applications. Such changes and modifications can be made without departing from the spirit and scope of he present invention. It is therefore intended that all such changes and modifications be covered by the following claims.

I claim:

1. In an electronic weighing apparatus including electrically powered scale means and a source of electrical power, the improvement comprising:

a base including a plurality of base supports positioned on a lower portion of the base to support the base on a support surface;

a platform mounted to the base to bear downward forces and to transmit downward forces to the scale means;

switch means for selectively connecting the scale means to the source to energize the scale means and disconnecting the scale means from the source to de-energize the scale means;

means for actuating the switch means, aid actuating means including an actuating member biased to an extended position, in which the actuating member supports a portion of the base above the support surface, and movable to a depressed position, said switch means responsive to the actuating member such that the scale means is de-energized when the actuating member is in the extended position and the scale means is energized when the actuating member is in the depressed position; and tab means for conducting externally applied vertical forces to the base to remove the actuating member to the depressed position to energize the scale means in the absence of applied vertical forces on the platform;

said actuating means biasing the actuating member to the extended position with a force adequate to prevent the weight of the weighing apparatus from moving the actuating member to the depressed position, thereby ensuring that the scale means is normally de-energized.

2. In an electronic weighing apparatus including electrically powered scale means and a source of electrical power, the improvement comprising:

a base including a plurality of base supports positioned on a lower portion of the base to support the base on a support surface;

a platform mounted to the base to bear downward forces and to transmit downward forces to the scale means;

electrical switch means, coupled to the source and the scale means, for selctively connecting and disconnecting the source and the scale means, said switch means responsive to an actuating member which is movable between an extended position, in which the switch means disconnects the scale means and the source, and a depressed position, in which the switch means connects the scale means to the source to energize the scale means;

said actuating member being biased to extend downwardly from the base such that in the absence of downward forces on the platform the actuating member remains in the extended position and supports at least one of said base supports above the support surface, and further, such that when a downward force greater than a selected value is applied to the platform the actuating member is moved to the depressed position, thereby energizing the scale means; and a protruding tab mounted to the base near the actuating member, said tab placed such that downward force can be applied to the base via the tab to move the actuating member to the depressed position without applying downward forces to the platform, thereby permitting the scale means to be energized for zero set adjustments without placing downward forces on the platform or the scale means.

3. The invention of claim 1 or 2 wherein the switch means includes a sealed switch mounted to the base.

4. The invention of claim 1 or 2 wherein the electrical source is a battery mounted in the base.

5. The invention of claim 1 or 2 wherein the base is rectangular and the plurality of base supports includes four base supports, each positioned at a respective corner of the base.

6. The invention of claim 5 wherein the actuating member is mounted adjacent one of the four base supports.

* * * * *

UNITED STATES PATENT AND TRADEMARK OFFICE
CERTIFICATE OF CORRECTION

PATENT NO. : 4,326,596
DATED : April 27, 1982
INVENTOR(S) : William Beck

It is certified that error appears in the above—identified patent and that said Letters Patent is hereby corrected as shown below:

In Column 6, line 17, delete "he" and insert therefor --the--.

In Claim 1, column 6, line 34, delete "aid" and insert therefor --said--.

In Claim 1, column 6, line 45, delete "remove" and insert therefor --move--.

Signed and Sealed this

Tenth Day of August 1982

[SEAL]

Attest:

Attesting Officer

GERALD J. MOSSINGHOFF

Commissioner of Patents and Trademarks